UNITED STATES PATENT OFFICE.

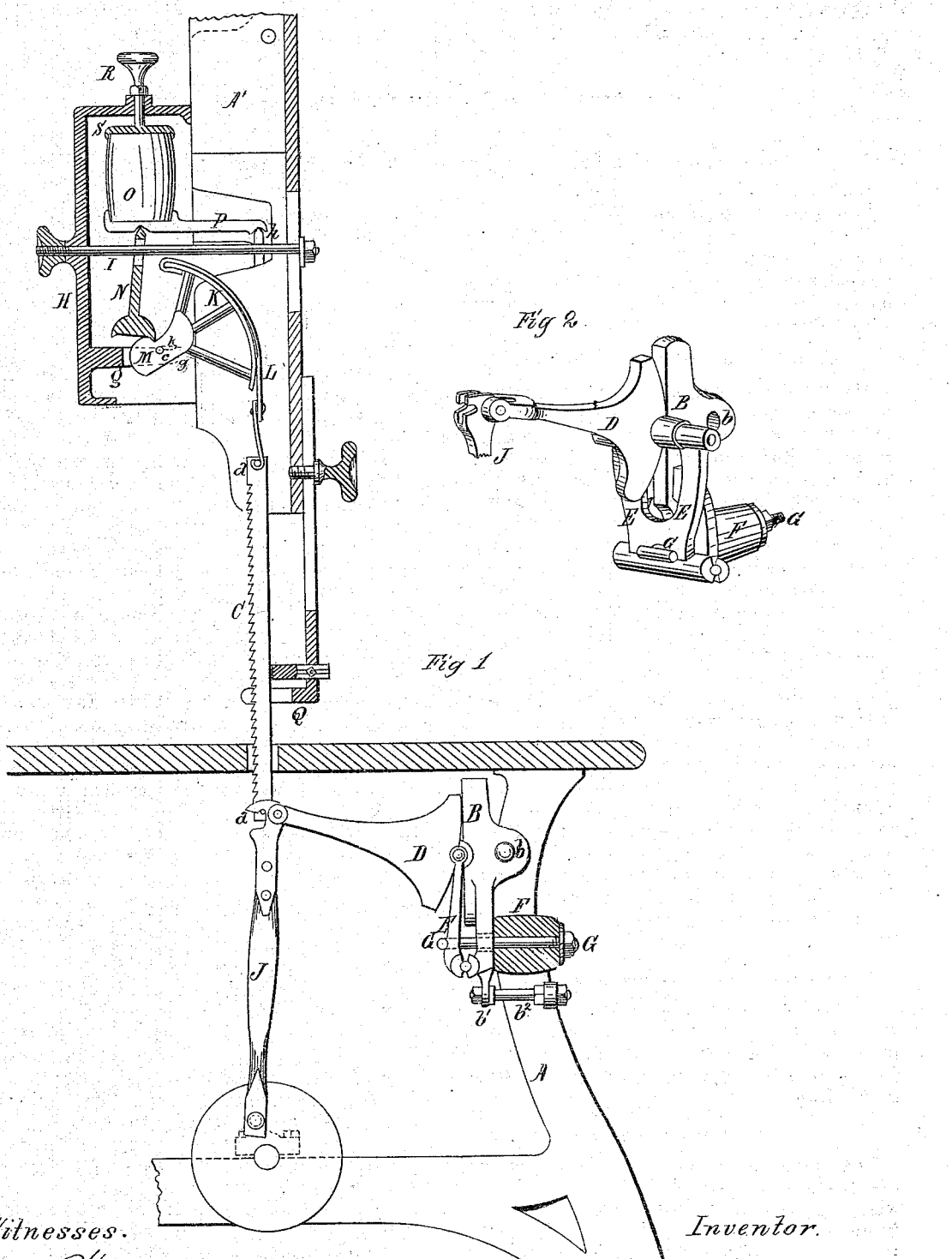

HENRY BICKFORD, OF CINCINNATI, OHIO, ASSIGNOR TO LEWIS FAGIN, TRUSTEE FOR MARY M. AND CARRIE M. FAGIN.

IMPROVEMENT IN SCROLL-SAWS.

Specification forming part of Letters Patent No. 136,207, dated February 25, 1873.

*To all whom it may concern:*

Be it known that I, HENRY BICKFORD, of Cincinnati, Hamilton county, State of Ohio, have invented certain new and useful Improvements in Scroll-Saws, of which the following is a specification:

Nature and Objects of Invention.

My invention relates to improvements upon the scroll-saw for which Letters Patent No. 115,210 were granted to me, as assignee of Hugh H. Humphrey and myself, May 23, 1871; and consists, first, in a peculiar construction of the link which connects the rolling arm of the saw to its stationary way, and the spring device for pressing the arm against the way, by which a powerful spring with but little motion is provided for, and the parts are of much simpler and cheaper construction than in the combination of stationary way, saw, rolling arm, link, and spring described in the said Letters Patent No. 115,210, on which combination my present invention, although not dispensing with any of the essential elements, is an improvement; second, in the provision of an adjustable device for the stationary way of the rolling arm, by which the former is rendered adjustable to give any required rake to the saw; third, in the combination of belt, segmental pulley, cam, and spring for straining the saw, directing it, and giving it the upward stroke; fourth, in a device for relieving the straining mechanism of the upper end of the saw from friction.

Description of the Accompanying Drawing.

Figure 1 is a vertical section of the complete working parts of a scroll-saw embodying my invention. Fig. 2 is a perspective view of the device for connecting the lower end of the saw to the frame.

General Description.

The upper end of the saw is supported upon the customary suspended frame A' or otherwise, and the lower end is connected to the frame A below the table. B is a stationary way or track, pivoted to the frame at $b$, and constructed with a bracket, $b^1$, connected to the frame A adjustably by means of bolt $b^2$. By the operation of this bolt the line of the way B may be so varied with relation to the line of the saw that any required "rake" may be given to the saw in the downward stroke to relieve the saw in the upward stroke from contact with the work. The saw C is connected at the lower end to the way or track B by the link E and rolling arm D, one end of the link being pivoted to the rolling arm and the other to the way B. Between the two pivots of the link a spring device is attached, which serves to press the rolling arm D against the way B. This device consists of rubber spring F and bolt G, the spring pressing against the back of the way B, and the bolt-head against the front face of the link, in the manner shown. By this device a loosely-placed pin can be used as a pivot of the lower end of the link, with half of the bearing in the way B and half in the end of the link, the bolt serving to hold the parts together. By reason of this construction and arrangement of the parts B D E F but little work is required to prepare and put the parts together, and the spring F is called upon to vibrate but little in the operation of the saw. The straining mechanism for the upper end of the saw is adjustably connected to the frame A' by box H and bolt I. The frame A' also supports the suspended saw-guide Q, as shown. Upon a projection, $g$, of the box H the axle $k$ of the segmental pulley K rests. A strap, L, connects the upper end of the saw with the upper end of the arc. Hooks $a$ are provided on the strap L and driving-pitman J, which are open-sided, to admit of the ready unhooking of the saw at either end to pass through a hole in the work. A cam, M, is provided upon or about the axle $k$, upon which the vibrating prop N of a gum spring, O, rests. The spring is preserved in place by the said prop in connection with the cupped plate P pivoted to the box H at $h$ and the adjusting-screw R, the latter pressing against a cupped plate, S, and serving to regulate the power of the spring over the saw.

The prop N in the operation of the saw vibrates upon the plate P and rolls over the cam M, the cam, in the motion of the saw downward by the power of the pitman, serving to compress the spring O sufficient to enable it in retraction to keep the saw stretched tightly in the upward stroke, the cam being so formed that the spring will exert the greatest force over the saw at the commencement of its upward stroke. This has been found by experience to be the most favorable point for the greatest strain in the rapid motion of reciprocating scroll-saws.

I prefer, in practice, that the axle $k$ shall roll upon the projection $g$ in order to reduce friction, and for this purpose I provide long recesses $c$ in the face of the projection $g$ on each side of the axle, to limit or confine this rolling motion to prevent displacement.

Claims.

1. The combination of way B, saw C, rolling arm D, link E, spring F, and connecting-bolt G, constructed and operating substantially as and for the purpose stated.

2. The pivoted way B $b$ $b^1$, in combination with the adjustable bolt $b^2$, operating substantially as and for the purpose specified.

3. The combination of saw C, belt or strap L, segmental pulley K $k$, cam M, and spring O, the parts being connected, and the whole operating substantially as and for the purpose specified.

4. The elements enumerated in the last preceding claim, in combination with the arm $g$ having elongated recesses $c$ for the bearings of the axis of the cam M, substantially as and for the purpose specified.

In testimony of which invention I hereunto set my hand.

H. BICKFORD.

Witnesses:
FRANK MILLWARD,
ELITHA F. LAYMAN.